United States Patent
Huang et al.

(10) Patent No.: US 12,499,576 B2
(45) Date of Patent: Dec. 16, 2025

(54) TRACKING DEVICE, CONTROL METHOD, AND NON-TRANSITORY COMPUTER READABLE STORAGE MEDIUM

(71) Applicant: HTC Corporation, Taoyuan (TW)

(72) Inventors: Chun-Kai Huang, Taoyuan (TW); Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 287 days.

(21) Appl. No.: 18/346,274

(22) Filed: Jul. 3, 2023

(65) Prior Publication Data
US 2024/0070911 A1 Feb. 29, 2024

Related U.S. Application Data

(60) Provisional application No. 63/373,553, filed on Aug. 26, 2022.

(51) Int. Cl.
*H04N 5/222* (2006.01)
*G06T 7/246* (2017.01)
*G06T 7/73* (2017.01)
*H04N 23/71* (2023.01)
*H04N 23/76* (2023.01)

(52) U.S. Cl.
CPC .............. *G06T 7/74* (2017.01); *G06T 7/248* (2017.01); *H04N 23/71* (2023.01); *H04N 23/76* (2023.01); *G06T 2207/10144* (2013.01); *G06T 2207/10152* (2013.01)

(58) Field of Classification Search
CPC . G06T 7/74; G06T 7/248; G06T 2207/10144; G06T 2207/10152; H04N 23/71; H04N 23/76; H04N 23/73; G01C 21/3837; G01C 1/00; G01C 11/04
See application file for complete search history.

(56) References Cited

U.S. PATENT DOCUMENTS

| | | | |
|---|---|---|---|
| 2018/0053283 A1* | 2/2018 | Hayasaka | G06T 5/73 |
| 2019/0043204 A1* | 2/2019 | Mandal | G06F 18/22 |
| 2020/0219267 A1* | 7/2020 | Rebecq | G06T 7/596 |
| 2021/0183161 A1* | 6/2021 | Upendran | G06T 17/00 |
| 2023/0117368 A1* | 4/2023 | Siddiqui | H04N 5/2224 345/474 |
| 2024/0070911 A1* | 2/2024 | Huang | H04N 23/71 |

FOREIGN PATENT DOCUMENTS

| | | |
|---|---|---|
| CN | 101052988 A | 10/2007 |
| CN | 108961169 A | 12/2018 |
| TW | 201310389 A | 3/2013 |
| WO | WO-2022220729 A1 * 10/2022 | G01C 21/04 |

OTHER PUBLICATIONS

The office action of the corresponding Taiwanese application No. TW112131308 issued on Jan. 26, 2024.

* cited by examiner

*Primary Examiner* — Howard D Brown, Jr.
(74) *Attorney, Agent, or Firm* — CKC & Partners Co., LLC (57) ABSTRACT

A tracking device includes a camera and a processor is disclosed. The camera is configured to capture several first pictures with a first setting group and several second pictures with a second setting group in turn. The processor is coupled to the camera. The processor is configured to select a current time point picture from several first pictures or several second pictures according to a current time point speed of the tracking device of the current time point, and to determine a current pose of the tracking device of the current time point according to the current time point picture.

20 Claims, 6 Drawing Sheets

TRACKING DEVICE, CONTROL METHOD, AND NON-TRANSITORY COMPUTER READABLE STORAGE MEDIUM

CROSS-REFERENCE TO RELATED APPLICATION

This application claims priority to U.S. Provisional Application Ser. No. 63/373,553, filed Aug. 26, 2022, which is herein incorporated by reference.

FIELD OF INVENTION

The present application relates to a tracking device, a control method, and a non-transitory computer readable storage medium. More particularly, the present application relates to a tracking device, a control method, and a non-transitory computer readable storage medium with a SLAM system.

BACKGROUND

The SLAM (simultaneous localization and mapping) algorithm in a SLAM system for tracking orientation and coordinate of a tracking device held and operated by a user in a VR (virtual reality) system is dependent on the frames of pictures captured by the camera disposed on the tracking device. However, when the tracking device moves, it can encounter a range of issues such as changes in the environment, significant variations in lighting, and high relative speeds. These factors can cause the captured frames of pictures to suffer from motion blur, overexposure, or underexposure, resulting in poor quality of the frames of pictures that can impact the accuracy of the SLAM algorithm's results.

Therefore, how to maintain the quality of the frames of pictures when the tracking device is moving, especially when the tracking device is moving in a fast speed, is a problem to be solved in need.

SUMMARY

The disclosure provides a tracking device. The tracking device includes a camera and a processor is disclosed. The camera is configured to capture several first pictures with a first setting group and several second pictures with a second setting group in turn. The processor is coupled to the camera. The processor is configured to select a current time point picture from several first pictures or several second pictures according to a current time point speed of the tracking device of the current time point, and to determine a current pose of the tracking device of the current time point according to the current time point picture.

The disclosure provides a control method. The control method is suitable for a tracking device. The control method includes the following operations: capturing several first pictures with a first setting group and several second pictures with a second setting group in turn; selecting a current time point picture from several first pictures or several second pictures according to a current time point speed of the tracking device of the current time point; and determining a current pose of the tracking device of the current time point according to the current time point picture.

The disclosure provides a non-transitory computer readable storage medium with a computer program to execute aforesaid control method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
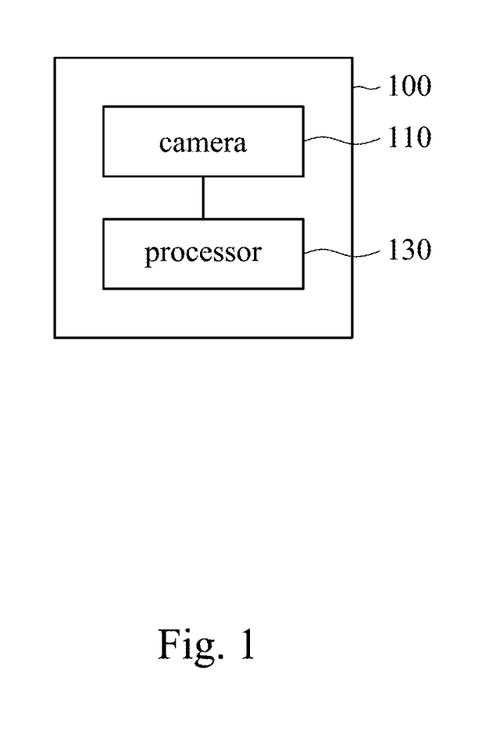
FIG. 1 is a schematic diagram illustrating a tracking device according to some embodiments of the present disclosure.

Reference is made to FIG. 1. FIG. 1 is a schematic diagram illustrating a tracking device 100 according to some embodiments of the present disclosure. In some embodiments, the tracking device 100 includes a SLAM system with a SLAM algorithm.

As shown in FIG. 1, the tracking device 100 includes a camera 110 and a processor 130. In some embodiments, the camera 110 is coupled to the processor 130.

Figure 2:
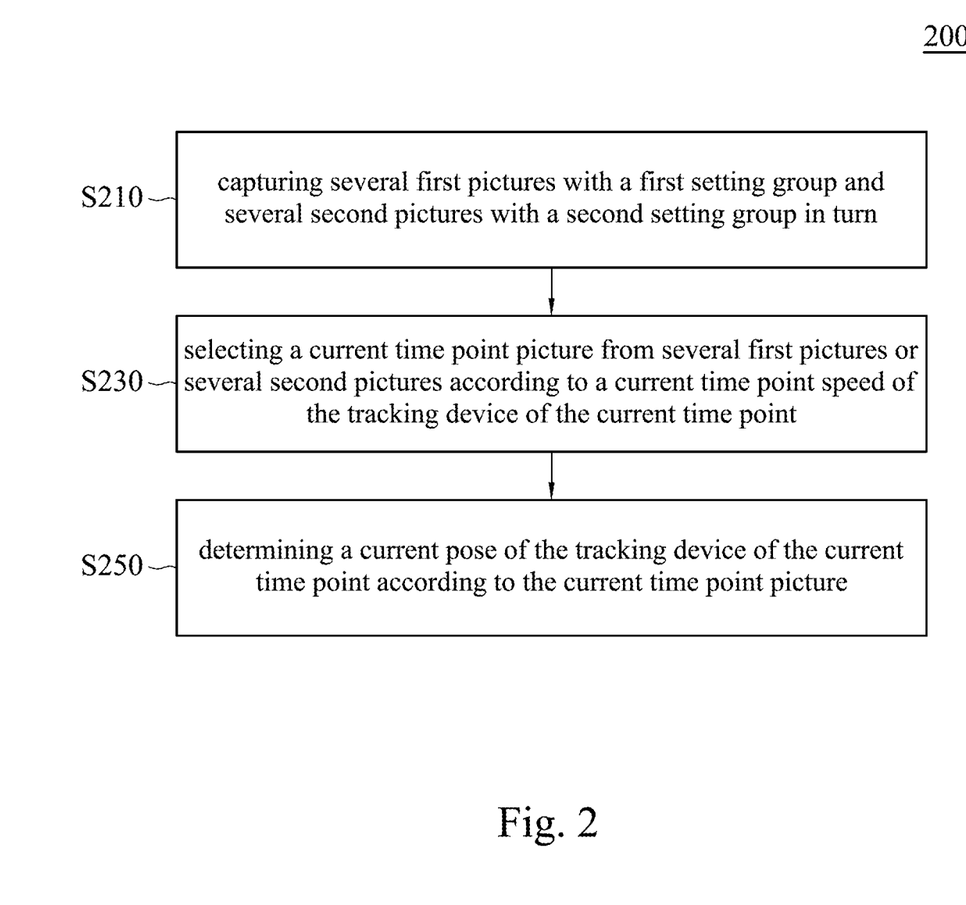
FIG. 2 is a flow chart diagram illustrating a control method according to some embodiments of the present disclosure.

Reference is made to FIG. 2. FIG. 2 is a flow chart diagram illustrating a control method 200 according to some embodiments of the present disclosure. The control method 200 is suitable to be executed by the tracking device 100 in FIG. 1. The control method 200 includes operations S210 to S250.

In operation S210, several first pictures with a first setting group and several second pictures with a second setting group are captured in turn. In some embodiments, operation S210 is operated by the camera 110 as illustrated in FIG. 1.

Figure 3:
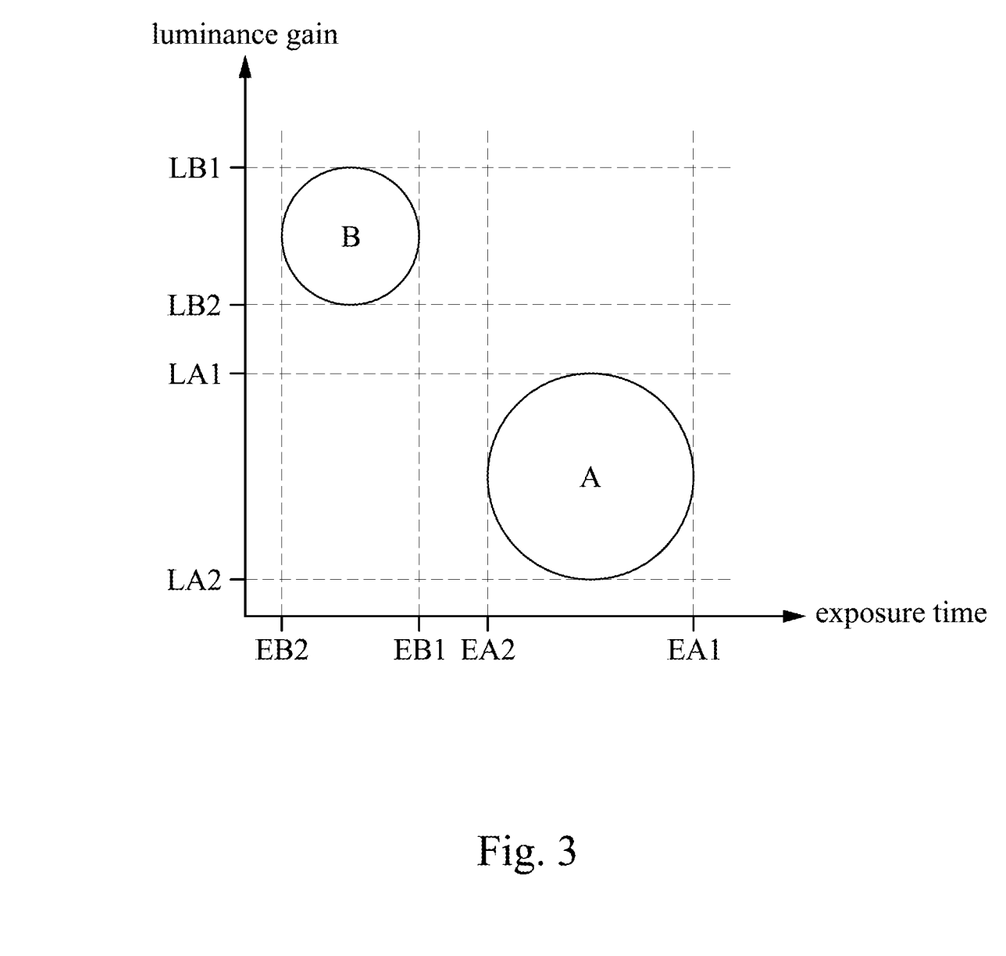
FIG. 3 is a schematic diagram illustrating an example of setting groups.

Reference is made to FIG. 3 together. FIG. 3 is a schematic diagram illustrating an example of setting groups. In some embodiments, the camera 110 as illustrated in FIG. 1 includes setting group A and setting group B. As illustrated in FIG. 3, the setting group A includes a first exposure time range and a first luminance gain range, and the setting group B includes a second exposure time range and a second luminance gain range.

In detail, the first exposure time range of the setting group A includes a shortest exposure time EA2 and a longest exposure time EA1, and the first luminance gain range of the setting group A includes a lowest luminance gain LA2 and a highest luminance gain LAL. The second exposure time range of the setting group B includes a shortest exposure time EB2 and a longest exposure time EB1, and the second luminance gain range of the setting group B includes a lowest luminance gain LB2 and a highest luminance gain LB1.

In some embodiments, as illustrated in FIG. 3, the shortest exposure time EA2 is longer than the longest exposure time EB1, and the highest luminance gain LA1 is lower than the lowest luminance gain LB2.

In some embodiments, the shortest exposure time EB2 is 0.6 ms, the longest exposure time EB1 is 1.4 ms, the lowest luminance gain LB2 is 156, and the highest luminance gain LB1 is 252. In some embodiments, the shortest exposure time EA2 is 1.6 ms, the longest exposure time EA1 is 3.4 ms, the lowest luminance gain LA2 is 126, and the highest luminance gain LA1 is 200. The examples of the setting group A and the setting group B as mentioned above is for illustrative purposes only, and the embodiments of the present disclosure are not limited thereto.

In some embodiments, the setting group A corresponds to a normal case, and the setting group B corresponds to a high velocity case.

Figure 4:
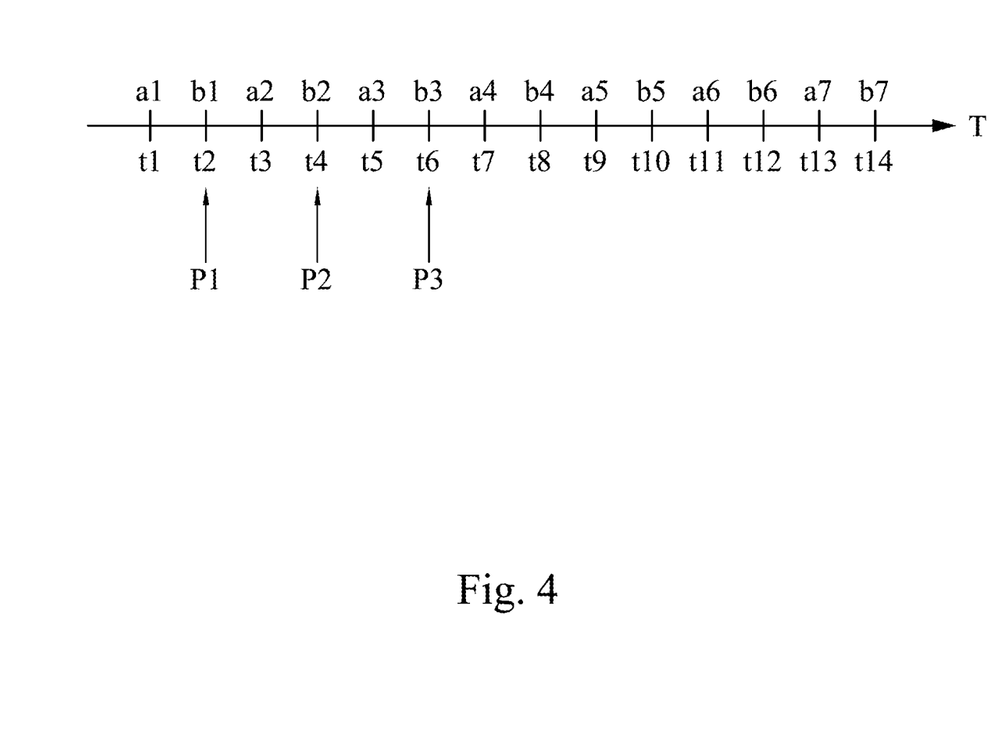
FIG. 4 is a schematic diagram illustrating an example of an operation as illustrated in FIG. 2 according to some embodiments of the present disclosure.

Reference is made to FIG. 4 together. FIG. 4 is a schematic diagram illustrating an example of operation S210 as illustrated in FIG. 2 according to some embodiments of the present disclosure. As illustrated in FIG. 4, the pictures a1 to a7 are captured by the camera 110 with setting group A, and the pictures b1 to b7 are captured by the camera 110 with setting group B. As illustrated in FIG. 4, at time point t1, picture a1 is captured. At time point t2, picture b1 is captured. At time point t3, picture a2 is captured, and so on.

As illustrated in FIG. 4, the camera 110 as illustrated in FIG. 1 captures pictures with setting group A and pictures with setting group B in turn.

Reference is made to FIG. 2 again. In operation S230, a current time point picture is selected from several first pictures or several second pictures according to a current time point speed of the tracking device of the current time point. In some embodiments, operation S230 is operated by the processor 130 as illustrated in FIG. 1.

Figure 5:
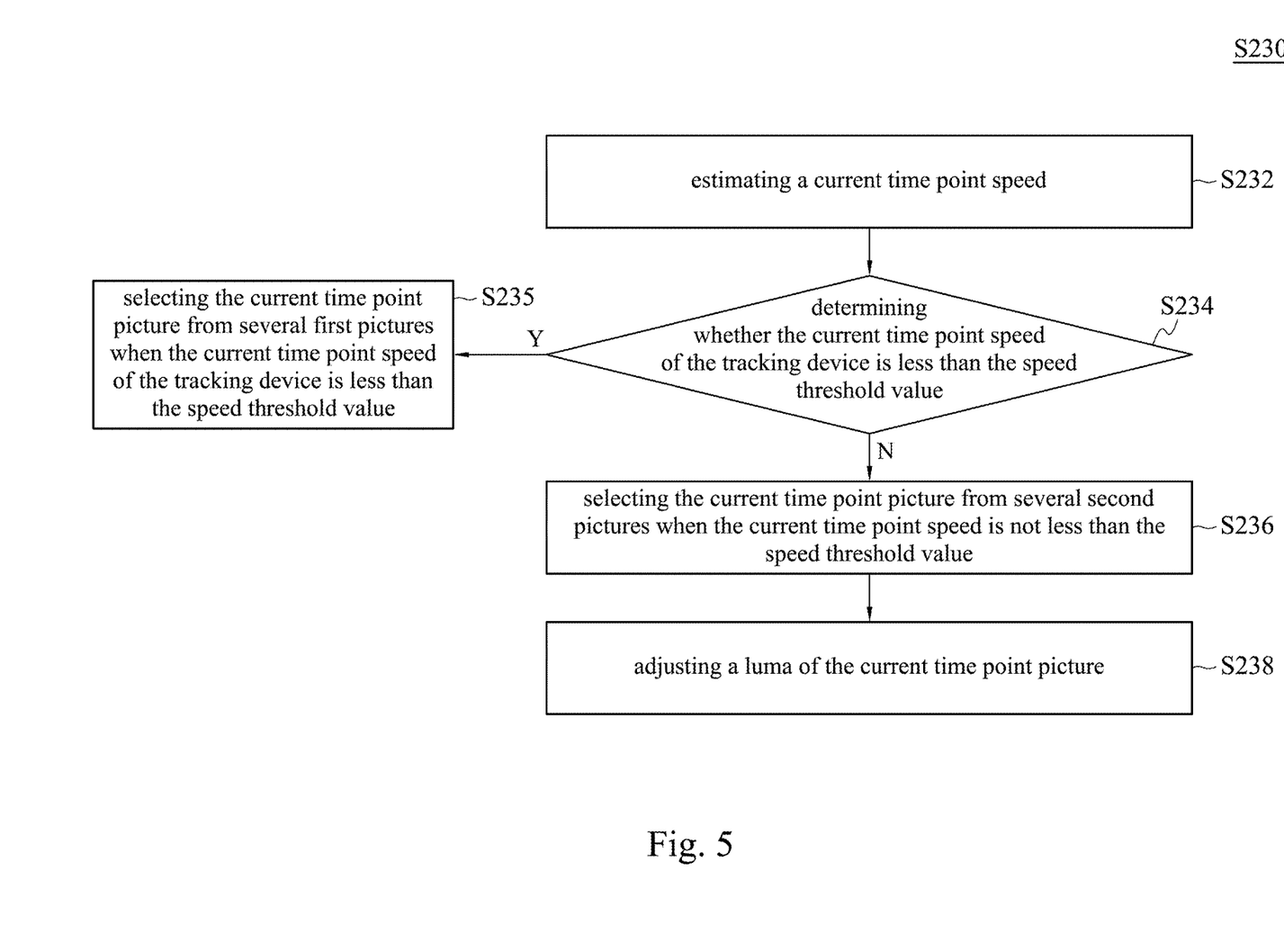
FIG. 5 is a flow chart diagram illustrating an example of an operation as illustrated in FIG. 2 according to some embodiments of the present disclosure.

Reference is made to FIG. 5 together. FIG. 5 is a flow chart diagram illustrating operation S230 of FIG. 2 according to some embodiments of the present disclosure. As illustrated in FIG. 5, the operation S230 includes operations S232 to S238.

Figure 6:
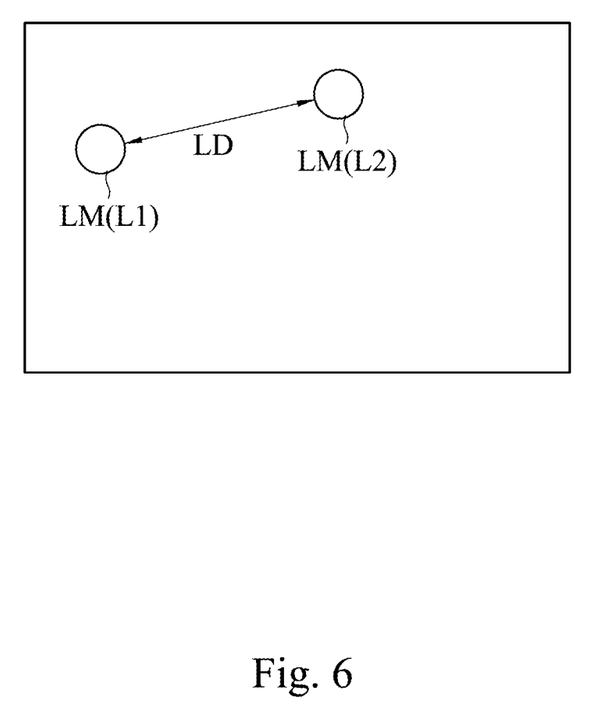
FIG. 6 is a schematic diagram illustrating an example of locations of landmark according to some embodiments of the present disclosure.

In operation S232, a current time point speed is estimated. In some embodiments, the current time point speed is estimated according to at least two of several previous locations of a landmark of several previous time points. In some embodiments, the current time point speed is estimated according to two previous locations of the landmark of two previous time points. Reference is made to FIG. 4 and FIG. 6 together. FIG. 6 is a schematic diagram illustrating an example of locations of landmark according to some embodiments of the present disclosure.

Assume that the processor 130 obtains a pose of the tracking device 100 every 10 ms, that is at time point t2, t4, t6, t8, and so on.

Assume that the current time point is time point t6, and previous to the time point t6, the processor 130 obtains a pose P1 according to the picture b1 captured at time point t2, and the processor 130 obtains a pose P2 according to the picture b2 captured at time point t4.

In some embodiments, the processor 130 estimates the time point speed of the time point t6 according to the pose P1 and the pose P2. In some embodiments, the processor 130 estimates the time point speed of the time point t6 according to the picture b1 and the picture b2.

Reference is made to FIG. 6. The landmark LM is an object in an environment in which the tracking device 100 as illustrated in FIG. 1 is operated. Assume that in the picture b1, the landmark LM is located at the location L1. In the picture b2, the landmark LM is located at the location L2.

In some embodiments, the processor 130 calculates a moving distance LD between the location L1 and the location L2. The processor 130 further estimates the current time point speed of the time point t6 according to the following formula:

$$v(t6) = \frac{L1 - L2}{t4 - t2},$$

wherein v(t6) is the current time point speed of the time point t6.

In some embodiments, more than one landmark is considered while estimating the current time point speed. For example, when in some embodiments, the processor 130 calculates the average movement of several landmarks in the pictures so as to estimate the current time point speed.

In some embodiments, more than two pictures of the previous time points are considered while estimating the current time point speed.

Reference is made to FIG. 5 again. In operation S234, it is determined whether the current time point speed of the tracking device is less than the speed threshold value. If the current time point speed of the tracking device is less than the speed threshold value, operation S235 is performed. On the other hand, if the current time point speed of the tracking device is not less than the speed threshold value, operation S236 is performed.

In operation S235, when the current time point speed of the tracking device 100 is less than the speed threshold value, the processor 130 is configured to select the current time point picture from pictures a1 to a7, which are captured with the setting group A.

In operation S236, when the current time point speed is not less than the speed threshold value, the processor 130 is configured to select the current time point picture from pictures b1 to b7, which are captured with the setting group B.

In some embodiments, in operation S235 and operation S236, when the processor 130 determines to select the current time point picture from pictures a1 to a7, and the current captured picture captured at the current time point is not one of the pictures a1 to a7, the processor 130 is further configured to select one of the pictures a1 to a7 captured at a previous time point, which is adjacent to the current time point, to be the current time point picture. Similarly, when the processor 130 determines to select the current time point picture from pictures b1 to b7, and the current captured picture captured at the current time point is not one of the pictures b1 to b7, the processor 130 is further configured to select one of the pictures b1 to b7 captured at a previous time point, which is adjacent to the current time point, to be the current time point picture.

For example, assume that the time point t6 is the current time point. If the processor 130 determines to select the current time point picture from pictures a1 to a7, and the current captured picture b3 captured at the current time point t6 is not one of the pictures a1 to a7, the processor 130 is further configured to select the picture a3 captured at a previous time point t5, which is adjacent to the current time point t6, to be the current time point picture of the current time point t6.

Reference is made to FIG. 5 again. In operation S238, a luma of the current time point picture is adjusted. After adjustment, a luma difference between the luma of the current time point picture and a luma of a corresponding picture captured by another setting group is smaller than a luma difference threshold value. The corresponding picture is the picture captured at a previous and adjacent time point.

In some embodiments, the luma of the current time point picture is adjusted by adjusting at least one of a brightness, a contrast, and a gamma of the current time point picture.

Reference is made to FIG. 4 together. Assume that in operation S236, picture b3 is selected to be the current time point picture at the current time point t6. In operation S238, the processor 130 adjust a luma of the picture b3 so that a luma difference between the luma of the picture b3 and the luma of the picture a3 is smaller than a luma difference threshold value.

Figure 7:
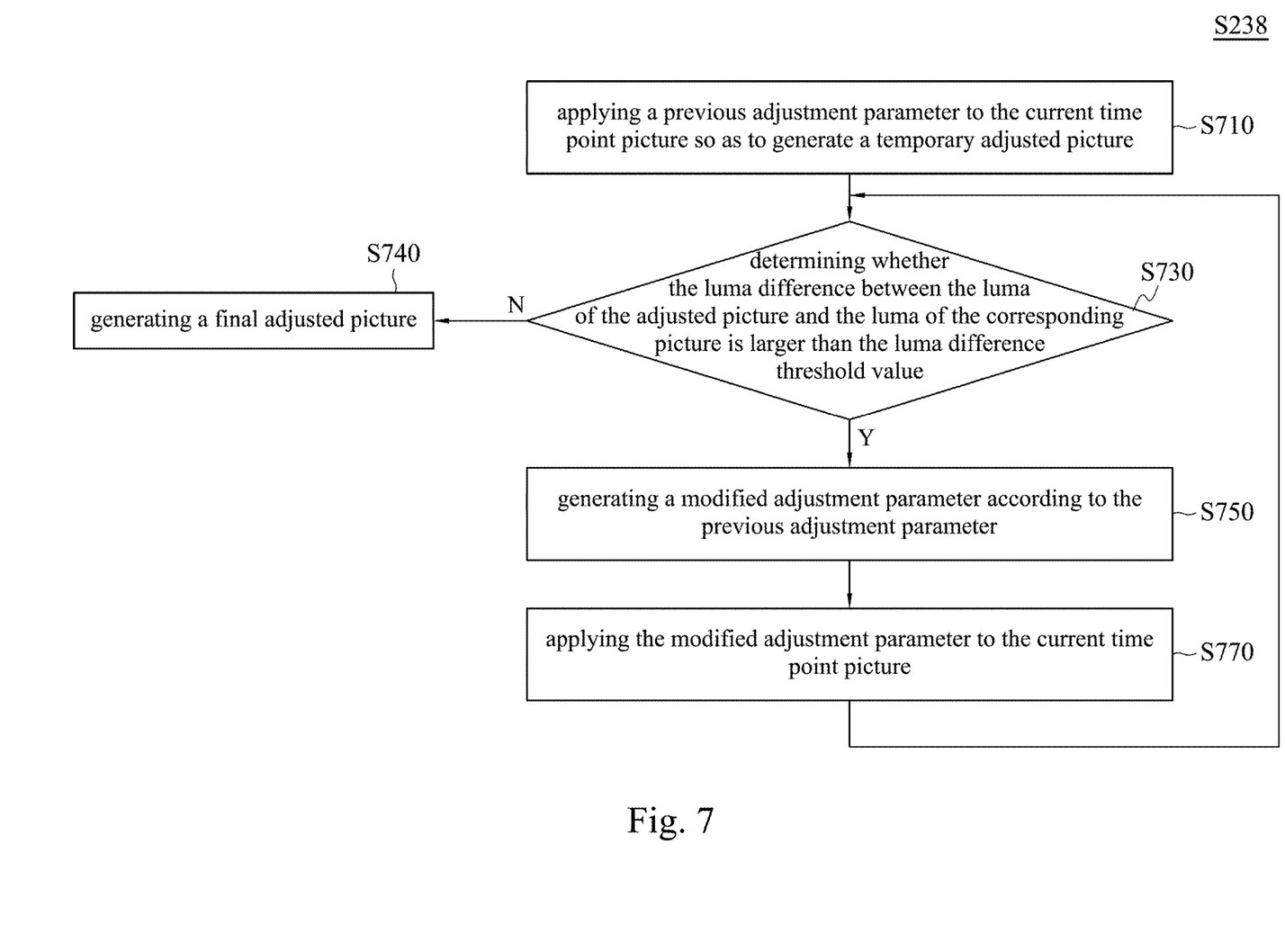
FIG. 7 is a flow chart diagram illustrating operation an operation as illustrated in FIG. 5 according to some embodiments of the present disclosure.

Reference is made to FIG. 7 together. FIG. 7 is a flow chart diagram illustrating operation S238 as illustrated in FIG. 5 according to some embodiments of the present disclosure. As illustrated in FIG. 7, operation S238 includes operations S710 to S770.

In operation S710, a previous adjustment parameter is applied to the current time point picture so as to generate a temporary adjusted picture. For example, assume that at time point t4, a first brightness value is applied to the current time point picture b2. The first brightness value is recorded as the previous adjustment parameter for the current time point t6, and the first brightness value is applied to the current time point picture b3 of the current time point t6 to generate the temporary adjusted picture.

In some embodiments, if the previous adjustment parameter does not exist, a random parameter is used as the previous adjustment parameter.

In operation S730, it is determined whether the luma difference between the luma of the temporary adjusted picture and the luma of the corresponding picture, which is captured previous and adjacent to the current time point, is larger than the luma difference threshold value. If the luma difference between the luma of the temporary adjusted picture and the luma of the corresponding picture is larger than the luma difference threshold value, operation S750 is operated. On the other hand, if the luma difference between the luma of the temporary adjusted picture and the luma of the corresponding picture is not larger than the luma difference threshold value, operation S740 is operated.

For example, after the first brightness value is applied to the current time point picture b3 of the current time point t6 to generate the temporary adjusted picture, the processor 130 as illustrated in FIG. 1 calculates a luma difference between the luma of the temporary adjusted picture and the luma of the corresponding picture a3 of time point t5. Since the time point t5 is the time point previous and adjacent to the time point t6, the picture a3 is taken as the corresponding picture of the picture b3 and the temporary adjusted picture generated according to the picture b3.

Then, the processor 130 determines whether the luma difference between the luma of the temporary adjusted picture and the luma of the corresponding picture a3 of time point t5 is larger than a luma difference threshold value.

In some embodiments, the luma difference is compared and calculated by each divided grid of the temporary adjusted picture and the corresponding picture.

In operation S740, a final adjusted picture is generated. In some embodiments, the processor 130 further records the current adjustment parameter for the next time point. The final adjusted picture is taken as the current time point picture when performing the operation S250 in FIG. 2.

In operation S750, a modified adjustment parameter is generated according to the previous adjustment parameter. In some embodiments, the modified adjustment parameter is generated by fine-tuning the previous adjustment parameter. For example, if a contrast of the previous adjustment parameter is 1, every time the previous adjustment parameter is adjusted, the contrast is added by 1 to generate the modified adjustment parameter.

In operation S770, the modified adjustment parameter is applied to the current time point picture. After operation S770, operation S730 is performed to compare the luma difference between the adjusted picture and the corresponding picture to the luma difference threshold value, until the luma difference between the adjusted picture and the corresponding picture is not larger than the luma difference threshold value.

Reference is made to FIG. 2 again. In operation S250, a current pose of the tracking device 100 of the current time point is determined according to the current time point picture. Several methods of determining the current pose of the tracking device 100 according to the current time point picture are within the embodiments of the present disclosure. For example, the processor 130 can determine the current pose of the tracking device 100 according to the current time point picture with a SLAM method of a SLAM system stored in the tracking device 100.

The above-mentioned method 200 for controlling a tracking device including a camera and a processor can be implemented as a computer program that is stored in a computer-readable storage medium so that after the computer reads said storage medium the computer performs the method 200. The computer-readable storage medium may be a read-only memory, flash memory, floppy disk, hard disk, compact disk, USB disc, magnetic tape, a database that may be accessed via internet, or other computer-readable storage media that can easily conceived by persons having ordinary skill in the art and preform the same function. The above-mentioned control method 200 for controlling the tracking device including a camera and a processor can also be implemented by incorporating the computer program and one or more processors or chips.

The embodiments of the present disclosure provide a tracking device, a control method, and a non-transitory computer readable storage medium, by utilizing the camera with two or more setting groups for capturing the pictures, an appropriate picture is selected from determining the pose of the tracking device by estimating the speed of the tracking device. Even the tracking device is moving in a high speed, the SLAM system can determine the current pose of the tracking device more accurately according to the selected picture. Moreover, by adjusting a luma of the selected pictures, the luma of the pictures of different setting groups are aligned, and the quality of the SLAM algorithm is increased.

In some embodiments, the processor 130 as illustrated in FIG. 1 can be, but is not limited to being, a single processor or an integration of multiple microprocessors such as CPUs or GPUs. The processor 130 is electrically coupled to a memory (not shown) of the tracking device 100 in order to access the at least one instruction. According to the at least one instruction, the above-mentioned control method 200 can be performed.

In some embodiments, the memory (not shown) can be a flash memory, a HDD, a SSD (Solid State Disk), a DRAM (Dynamic Random Access Memory) or a SRAM (Static Random-Access Memory). In some embodiments, the memory (not shown) can be a non-transitory computer readable medium stored with at least one instruction associated with the control method 200. The at least one instruction can be accessed and executed by the processor 130.

In some embodiments, the camera 110 as illustrated in FIG. 1 can be an image capturing circuit or any other elements or circuits with the same or similar functions.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking device, comprising:
a camera, configured to capture a plurality of first pictures with a first setting group and a plurality of second pictures with a second setting group in turn; and
a processor, coupled to the camera, wherein the processor is configured to estimate a current time point speed, to select a current time point picture from the plurality of first pictures or the plurality of second pictures according to the current time point speed of the tracking device of a current time point, and to determine a current pose of the tracking device of the current time point according to the current time point picture.

2. The tracking device of claim 1, wherein the first setting group comprises a first exposure time range and a first luminance gain range, and the second setting group comprises a second exposure time range and a second luminance gain range.

3. The tracking device of claim 2, wherein a shortest exposure time of the first exposure time range is longer than a longest exposure time of the second exposure time range, and a highest luminance gain of the first luminance gain range is lower than a lowest luminance gain of the second luminance gain range.

4. The tracking device of claim 1, wherein when the current time point speed of the tracking device is less than a speed threshold value, the processor is configured to select the current time point picture from the plurality of first pictures, and when the current time point speed is not less than the speed threshold value, the processor is configured to select the current time point picture from the plurality of second pictures.

5. The tracking device of claim 4, wherein the processor is further configured to estimate the current time point speed according to at least two of a plurality of previous locations of a landmark of a plurality of previous time points.

6. The tracking device of claim 4, wherein when the current time point picture is selected from the plurality of second pictures, the processor is further configured to adjust a first luma of the current time point picture so that a first luma difference between the first luma of the current time point picture and a second luma of a corresponding picture of the plurality of first pictures is smaller than a luma difference threshold value, wherein the corresponding picture is captured at a previous time point previous and adjacent to the current time point.

7. The tracking device of claim 6, wherein the processor is further configured to adjust the first luma of the current time point picture by adjusting at least one of a brightness, a contrast, and a gamma of the current time point picture.

8. The tracking device of claim 6, wherein the processor is further configured to apply a previous adjustment parameter to the current time point picture so as to generate a temporary adjusted picture, to calculate a second luma difference between a third luma of the temporary adjusted picture and the second luma of the corresponding picture of the plurality of first pictures, and to apply a modified adjustment parameter to the current time point picture when the second luma difference is larger than the luma difference threshold value, wherein the modified adjustment parameter is generated according to the previous adjustment parameter.

9. The tracking device of claim 1, wherein when the processor determines to select the current time point picture from the plurality of first pictures, and a current captured picture captured at the current time point is not one of the plurality of first pictures, the processor is further configured to select one of the plurality of first pictures captured at a previous time point to be the current time point picture, wherein the previous time point is adjacent to the current time point.

10. A control method, suitable for a tracking device, comprising:
capturing a plurality of first pictures with a first setting group and a plurality of second pictures with a second setting group in turn;
estimating a current time point speed to select a current time point picture from the plurality of first pictures or the plurality of second pictures according to the current time point speed of the tracking device of a current time point; and
determining a current pose of the tracking device of the current time point according to the current time point picture.

11. The control method of claim 10, wherein the first setting group comprises a first exposure time range and a first luminance gain range, and the second setting group comprises a second exposure time range and a second luminance gain range.

12. The control method of claim 11, wherein a shortest exposure time of the first exposure time range is longer than a longest exposure time of the second exposure time range, and a highest luminance gain of the first luminance gain range is lower than a lowest luminance gain of the second luminance gain range.

13. The control method of claim 10, further comprising:
selecting the current time point picture from the plurality of first pictures when the current time point speed of the tracking device is less than a speed threshold value; and selecting the current time point picture from the plurality of second pictures when the current time point speed is not less than the speed threshold value.

14. The control method of claim 13, further comprising:
estimating the current time point speed according to at least two of a plurality of previous locations of a landmark of a plurality of previous time points.

15. The control method of claim 13, further comprising:
adjusting a first luma of the current time point picture so that a first luma difference between the first luma of the current time point picture and a second luma of a corresponding picture of the plurality of first pictures is smaller than a luma difference threshold value when the current time point picture is selected from the plurality of second pictures, wherein the first luma of the current time point picture is adjusted by adjusting at least one of a brightness, a contrast, and a gamma of the current time point picture, wherein the corresponding picture is captured at a previous time point previous and adjacent to the current time point.

16. The control method of claim 15, further comprising:
applying a previous adjustment parameter to the current time point picture so as to generate a temporary adjusted picture;
calculating a second luma difference between a third luma of the temporary adjusted picture and the second luma of the corresponding picture of the plurality of first pictures; and
applying a modified adjustment parameter to the current time point picture when the second luma difference is larger than the luma difference threshold value, wherein the modified adjustment parameter is generated according to the previous adjustment parameter.

17. The control method of claim 10, further comprising:
when the current time point picture is selected from the plurality of first pictures according to the current time point speed and a current captured picture captured at the current time point is not one of the plurality of first pictures, one of the plurality of first pictures captured at a previous time point is selected to be the current time point picture, wherein the previous time point is adjacent to the current time point.

18. A non-transitory computer readable storage medium with a computer program to execute a control method, wherein the control method comprises:
estimating a current time point speed to select a current time point picture from a plurality of first pictures or a plurality of second pictures according to the current time point speed of a tracking device of a current time point, wherein the plurality of first pictures and the plurality of second pictures are captured in turn by a camera of the tracking device, wherein the plurality of first pictures are captured with a first setting group and the plurality of second pictures are captured with a second setting group; and
determining a current pose of the tracking device of the current time point according to the current time point picture.

19. The non-transitory computer readable storage medium of claim 18, wherein the control method further comprises:
selecting the current time point picture from the plurality of first pictures when the current time point speed of the tracking device is less than a speed threshold value; and
selecting the current time point picture from the plurality of second pictures when the current time point speed is not less than the speed threshold value.

20. The non-transitory computer readable storage medium of claim 19, wherein the control method further comprises:
adjusting a first luma of the current time point picture so that a first luma difference between the first luma of the current time point picture and a second luma of a corresponding picture of the plurality of first pictures is smaller than a luma difference threshold value when the current time point picture is selected from the plurality of second pictures, wherein the first luma of the current time point picture is adjusted by adjusting at least one of a brightness, a contrast, and a gamma of the current time point picture, wherein the corresponding picture is captured at a previous time point previous and adjacent to the current time point.

* * * * *